(12) United States Patent
Tanimura et al.

(10) Patent No.: US 10,720,992 B2
(45) Date of Patent: Jul. 21, 2020

(54) TRANSMISSION APPARATUS, RECEPTION APPARATUS, AND METHOD FOR ESTIMATING CHARACTERISTICS OF TRANSMISSION LINE

(71) Applicant: FUJITSU LIMITED, Kawasaki-shi, Kanagawa (JP)

(72) Inventors: Takahito Tanimura, Yokohama (JP); Takeshi Hoshida, Kawasaki (JP); Shigeki Watanabe, Kawasaki (JP); Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 16/011,849

(22) Filed: Jun. 19, 2018

(65) Prior Publication Data
US 2018/0375580 A1 Dec. 27, 2018

(30) Foreign Application Priority Data

Jun. 26, 2017 (JP) ................................ 2017-124392

(51) Int. Cl.
*H04B 10/61* (2013.01)
*H04B 10/2513* (2013.01)
(Continued)

(52) U.S. Cl.
CPC ..... *H04B 10/25133* (2013.01); *G01M 11/333* (2013.01); *G01M 11/335* (2013.01);
(Continued)

(58) Field of Classification Search
CPC combination set(s) only.
See application file for complete search history.

(56) References Cited

U.S. PATENT DOCUMENTS

| 5,717,510 A * | 2/1998 | Ishikawa ............ H04B 10/0795 398/147 |
| 8,184,992 B2 * | 5/2012 | Kikuchi ................. H04B 10/61 398/202 |

(Continued)

FOREIGN PATENT DOCUMENTS

| JP | 2006-295479 | 10/2006 |
| JP | 2012-124686 | 6/2012 |
| WO | 2006/109870 | 10/2006 |

OTHER PUBLICATIONS

D.C. Kilper et al., "Optical Performance Monitoring," IEEE Journal of Ligthwave Technology vol. 22, No. 1, pp. 294-304, 2004 (11 pages).

(Continued)

*Primary Examiner* — Omar S Ismail
(74) *Attorney, Agent, or Firm* — Fujitsu Patent Center

(57) ABSTRACT

There is provided a transmission apparatus including a transmitter configured to modulate a signal to a first signal having a first wavelength and a signal to a second signal having a second wavelength, and transmit the first signal and the second signal to a transmission line so that the second signal is varied in accordance with variation in an amount of cross phase modulation of the first signal passing through each position on the transmission line, and a signal processor configured to include at least one of a logic device and a processor, and configured to add an amount of chromatic dispersion at which a remaining amount of chromatic dispersion of the first wavelength at a certain position on the transmission line is equal to zero to the first wavelength in the transmission of the first signal and the second signal.

10 Claims, 15 Drawing Sheets

(51) Int. Cl.
*G01M 11/00* (2006.01)
*H04B 10/50* (2013.01)
*H04B 10/073* (2013.01)

(52) U.S. Cl.
CPC ......... *H04B 10/0731* (2013.01); *H04B 10/50* (2013.01); *H04B 10/61* (2013.01)

(56) References Cited

U.S. PATENT DOCUMENTS

| | | | | |
|---|---|---|---|---|
| 2002/0097469 | A1* | 7/2002 | Yee | H04B 10/2507 398/76 |
| 2005/0238362 | A1* | 10/2005 | Sekiya | H04B 10/0795 398/147 |
| 2006/0291868 | A1* | 12/2006 | Yee | H04B 10/50 398/152 |
| 2008/0013162 | A1* | 1/2008 | Shukunami | G01M 11/319 359/334 |
| 2010/0021179 | A1* | 1/2010 | Kikuchi | H04B 10/61 398/183 |
| 2013/0236169 | A1* | 9/2013 | Gaudette | H04B 10/0795 398/25 |
| 2013/0259479 | A1* | 10/2013 | Mizuguchi | H04B 10/2507 398/65 |
| 2014/0071436 | A1* | 3/2014 | Cyr | G01N 21/21 356/73.1 |
| 2015/0372766 | A1* | 12/2015 | Yoshida | H04B 10/2507 398/193 |
| 2016/0344481 | A1* | 11/2016 | Vassilieva | H04J 14/0221 |
| 2017/0310390 | A1* | 10/2017 | Shiner | H04B 10/0775 |

OTHER PUBLICATIONS

F.N. Hauske et al., "Optical Performance Monitoring in Digital Coherent Receivers," IEEE Journal of Ligthwave Technology vol. 27, No. 16, pp. 3623-3631, 2009 (9 pages).

Z. Tao et al., "Simple Fiber Model for Determination of XPM Effects" J. LightwaveTechnology, vol. 29, No. 7, pp. 374-986, Apr. 2011 (13 pages).

* cited by examiner

TRANSMISSION APPARATUS, RECEPTION APPARATUS, AND METHOD FOR ESTIMATING CHARACTERISTICS OF TRANSMISSION LINE

CROSS-REFERENCE TO RELATED APPLICATION

This application is based upon and claims the benefit of priority of the prior Japanese Patent Application No. 2017-124392, filed on Jun. 26, 2017, the entire contents of which are incorporated herein by reference.

FIELD

The embodiments discussed herein are related to a transmission apparatus, a reception apparatus, and a method for estimating characteristics of a transmission line.

BACKGROUND

Various methods of monitoring the physical states of transmission lines are adopted in optical transmission systems. For example, in a monitoring method using optical channel monitors (OCMs), the OCMs are dispersedly arranged on the transmission line or at nodes on the transmission line to monitor the physical state of each point on the transmission line from the results of measurement by the respective OCMs. With this method, the physical state of each point on the transmission line is capable of being monitored even when the transmission line has a multi-span configuration.

In a monitoring method using optical time domain reflectometers (OTDRs), optical pulses are transmitted on the transmission line to detect Rayleigh backscattered light and reflected light for the optical pulse from each point on the transmission line. With this method, the physical state of each point on the transmission line, for example, the transmission loss on the transmission line and the connection loss of, for example, fusion splicing, mechanical splicing, or connector connection are capable of being monitored based on the Rayleigh backscattered light and reflected light.

In a monitoring method using a coefficient used for an adaptive equalizer in main signal processing of a digital coherent receiver, the physical state of the transmission line is calculated using the coefficient. With this method, the physical state of the transmission line is capable of being monitored using the coefficient even when the transmission line has the multi-span configuration.

For example, refer to Japanese Laid-open Patent Publication No. 2012-124686, Japanese Laid-open Patent Publication No. 2006-295479, D.C. Kilper, R. Bach, D. J. Blumenthal, D. Einstein, T. Landolsi, L. Ostar, M. Preiss, and A. E. Willner, "Optical Performance Monitoring," IEEE JLT22, 1, pp.294-304, 2004, and F. N. Hauske, M. Kuschnerov, B. Spinnler, and B. Lankl, "Optical Performance Monitoring in Digital Coherent Receivers," IEEE JLT27, 16, pp.3623-3631, 2009.

SUMMARY

According to an aspect of the invention, a transmission apparatus includes a transmitter configured to modulate a signal to a first signal having a first wavelength and a signal to a second signal having a second wavelength, and transmit the first signal and the second signal to a transmission line so that the second signal is varied in accordance with variation in an amount of cross phase modulation of the first signal passing through each position on the transmission line, and a signal processor configured to include at least one of a logic device and a processor, and configured to add an amount of chromatic dispersion at which a remaining amount of chromatic dispersion of the first wavelength at a certain position on the transmission line is equal to zero to the first wavelength in the transmission of the first signal and the second signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Since the OCMs are dispersedly arranged at monitoring points in the monitoring method using the OCMs, the component cost is increased. In addition, the monitoring method using the OTDRs does not support the transmission line having the multi-span configuration. Furthermore, it is difficult to monitor one point on the transmission line in the monitoring method using the coefficient for the adaptive equalizer. Accordingly, a monitoring method is desired, which is capable of reducing the component cost and monitoring the physical state of each point even on the transmission line having the multi-span configuration.

Figure 1:
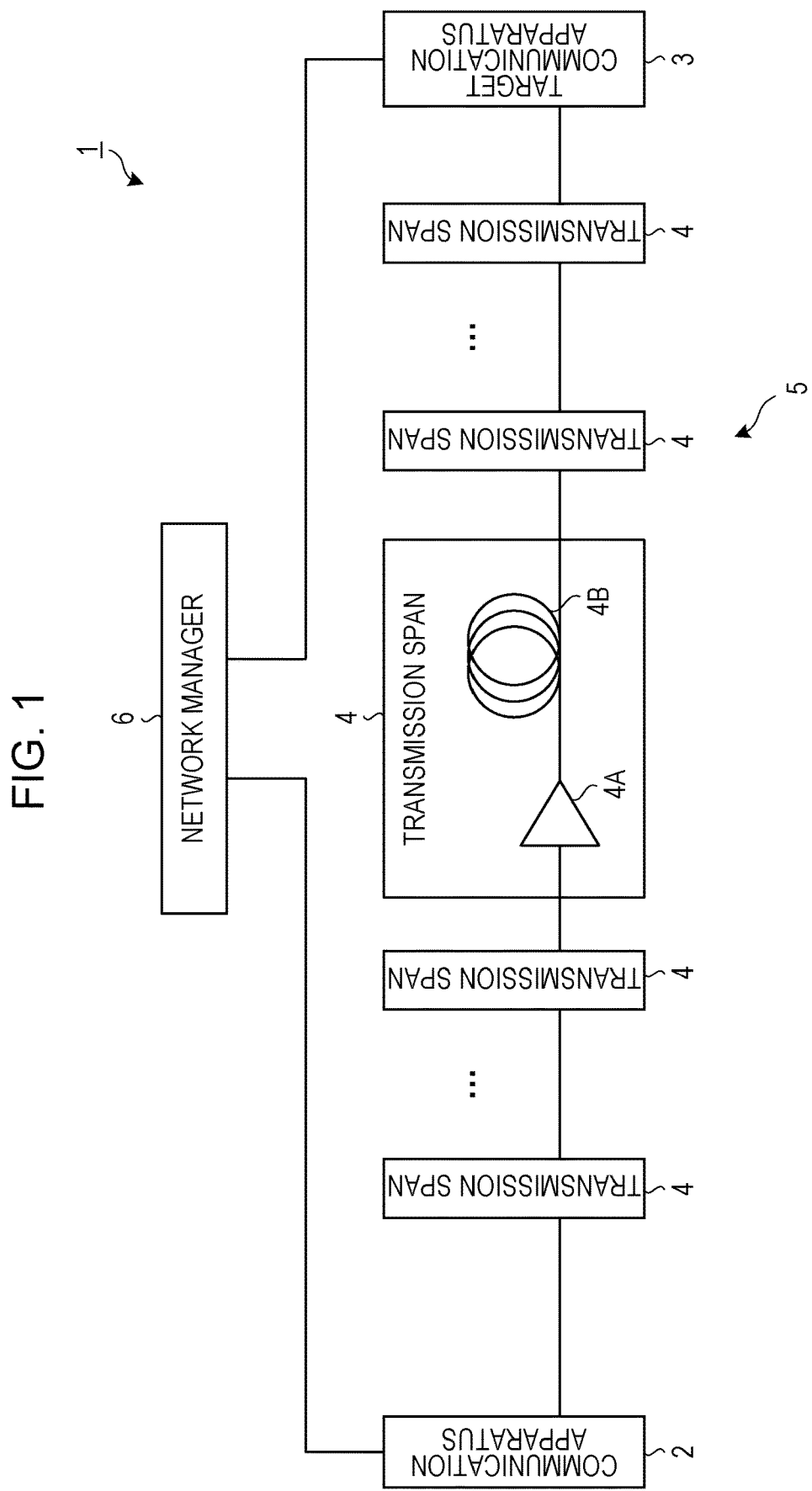
FIG. 1 is an explanatory diagram illustrating an example of an optical transmission system according to an embodiment.

Embodiments of a technology capable of monitoring the physical state at each point on a transmission line will herein be described in detail with reference to the drawings. The disclosed technology is not limited by the embodiments. The embodiments described below may be appropriately combined within a consistent range. Embodiments FIG. 1 is an explanatory diagram illustrating an example of an optical transmission system 1 according to an embodiment. Referring to FIG. 1, the optical transmission system 1 includes a communication apparatus 2, a target communication apparatus 3, an optical transmission line 5 including multiple transmission spans 4, and a network manager 6. Each of the communication apparatus 2 and the target communication apparatus 3 is, for example, a digital coherent optical communication apparatus. Each transmission span 4 includes an optical amplifier 4A and a transmission line 4B. The optical amplifier 4A amplifies an optical signal passing on the transmission line 4B. The transmission line 4B is an optical fiber on which the optical signal is transmitted. The optical transmission line 5 has a multistage configuration in which the multiple transmission spans 4 are provided. The network manager 6 is, for example, a server that monitors and controls the entire optical transmission system 1.

Figure 2:
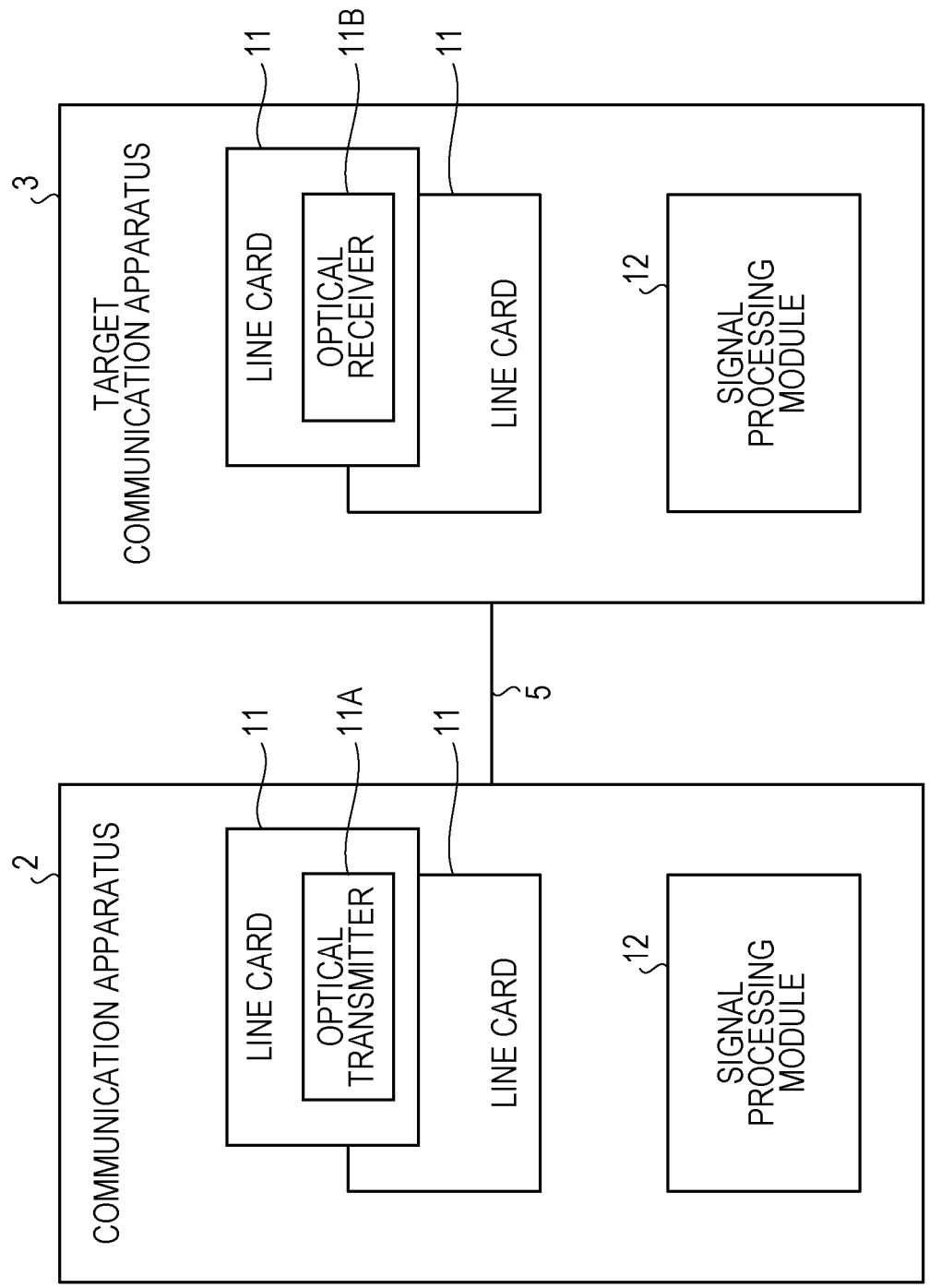
FIG. 2 is an explanatory diagram illustrating an example of a communication apparatus and a target communication apparatus.

FIG. 2 is an explanatory diagram illustrating an example of the communication apparatus 2 and the target communication apparatus 3. The communication apparatus 2 illustrated in FIG. 2 has multiple line cards 11 and a signal processing module 12 installed therein. For example, an optical transmitter and/or an optical receiver is installed in each line card 11. The signal processing module 12 is a processor that monitors the physical state of each point on the transmission line 4B on the transmission span 4. The target communication apparatus 3 illustrated in FIG. 2 also has the multiple line cards 11 and the signal processing module 12 installed therein, as in the communication apparatus 2. Each line card 11 in the communication apparatus 2 includes, for example, an optical transmitter 11A that transmits an optical signal for an optical receiver 11B in the target communication apparatus 3. Each line card 11 in the target communication apparatus 3 includes, for example, the optical receiver 11B that receives the optical signal from the optical transmitter 11A in the communication apparatus 2. Although each line card 11 in the communication apparatus 2 includes the optical transmitter 11A and each line card 11 in the target communication apparatus 3 includes the optical receiver 11B for convenience, the line card 11 may include both the optical transmitter 11A and the optical receiver 11B.

Figure 3:
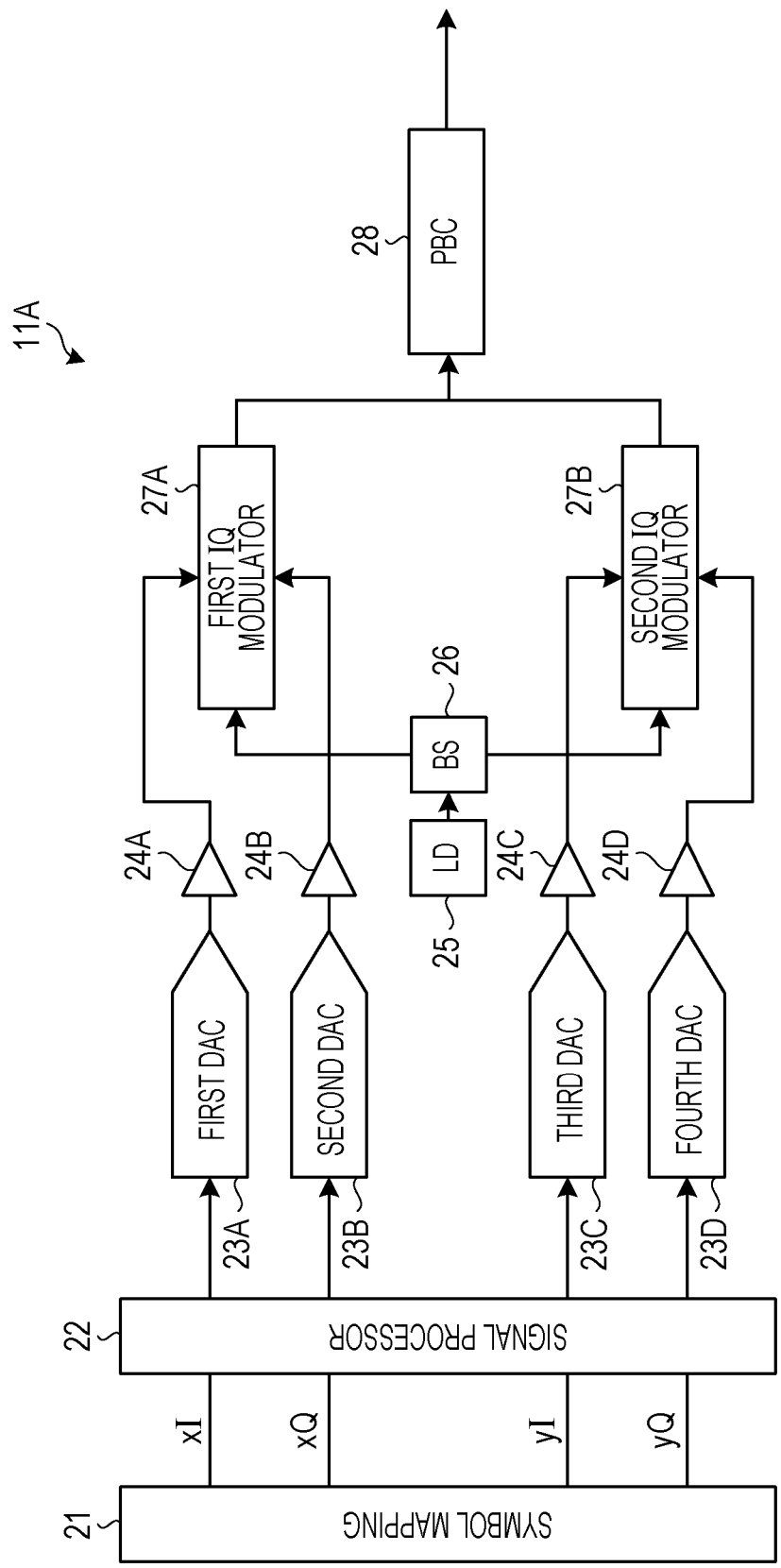
FIG. 3 is a block diagram illustrating an exemplary configuration of an optical transmitter.

FIG. 3 is a block diagram illustrating an exemplary configuration of the optical transmitter 11A. Referring to FIG. 3, the optical transmitter 11A includes a symbol mapping 21, a signal processor 22, a first digital analog converter (DAC) 23A to a fourth DAC 23D, and a first driver amplifier 24A to a fourth driver amplifier 24D. The optical transmitter 11A further includes a laser diode (LD) 25, a beam splitter (BS) 26, a first in-phase and quadrature (IQ) modulator 27A, a second IQ modulator 27B, and a polarization beam combiner (PBC) 28.

The symbol mapping 21 is a processor that maps a transmission pattern on a symbol array. The signal processor 22 is a digital signal processor (DSP) that performs signal processing to the symbol array. The first DAC 23A to the fourth DAC 23D each convert the symbol array into an analog signal and supply the analog signal to the first driver amplifier 24A to the fourth driver amplifier 24D, respectively.

The first driver amplifier 24A supplies a driving signal corresponding to the analog signal of the symbol array to the first IQ modulator 27A. The second driver amplifier 24B supplies the driving signal corresponding to the analog signal of the symbol array to the first IQ modulator 27A. The third driver amplifier 24C supplies the driving signal corresponding to the analog signal of the symbol array to the second IQ modulator 27B. The fourth driver amplifier 24D supplies the driving signal corresponding to the analog signal of the symbol array to the second IQ modulator 27B. The LD 25 supplies the optical signal to the BS 26. The BS 26 supplies the optical signal to the first IQ modulator 27A and the second IQ modulator 27B. The first IQ modulator 27A generates an optical modulation signal at the side of an X polarization component that performs optical modulation to the optical signal with the driving signal. The second IQ modulator 27B generates an optical modulation signal at the side of a Y polarization component that performs the optical modulation to the optical signal with the driving signal. The PBC 28 combines the optical modulation signal at the X polarization component side from the first IQ modulator 27A with the optical modulation signal at the Y polarization component side from the second IQ modulator 27B and supplies the optical modulation signal to the optical transmission line 5 as a transmission symbol.

Figure 4:
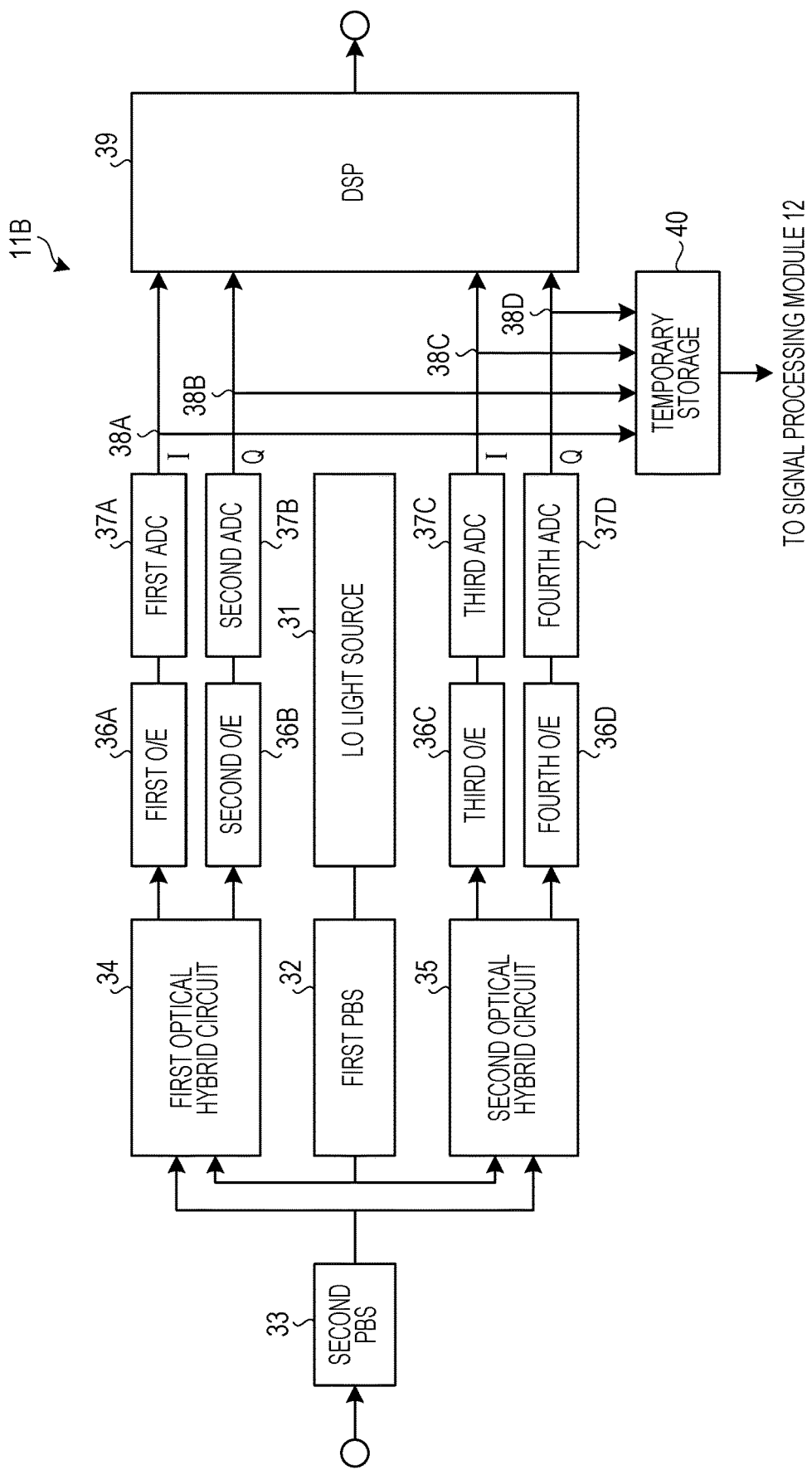
FIG. 4 is a block diagram illustrating an exemplary configuration of an optical receiver.

FIG. 4 is a block diagram illustrating an exemplary configuration of the optical receiver 11B. Referring to FIG. 4, the optical receiver 11B includes an LO light source (local laser diode) 31, a first polarization beam splitter (PBS) 32, a second PBS 33, a first optical hybrid circuit 34, and a second optical hybrid circuit 35. The optical receiver 11B further includes a first optical/electrical (O/E) converter 36A to a fourth O/E converter 36D and a first analog-to-digital converter (ADC) 37A to a fourth ADC 37D. The optical receiver 11B further includes a first optical tap 38A to a fourth optical tap 38D, a digital signal processor (DSP) 39, and a temporary storage 40.

The LO light source 31 is a laser that emits, for example, local light. The first PBS 32 splits the local light from the LO light source 31 and supplies the local light resulting from the splitting to the first optical hybrid circuit 34 and the second optical hybrid circuit 35. The second PBS 33 splits a reception signal into two polarization states that are orthogonal to each other, for example, an X polarization component and a Y polarization component. The X polarization component is a horizontal polarization component and the Y polarization component is a vertical polarization component. The second PBS 33 supplies the X polarization component to the first optical hybrid circuit 34. The second PBS 33 supplies the Y polarization component to the second optical hybrid circuit 35.

The first optical hybrid circuit 34 causes interference between the X polarization component of the reception signal and the local light to acquire the optical signal having an in-phase (I) component and a quadrature (Q) component. The I component is the component of an in-phase axis and the Q component is the component of a quadrature axis. The first optical hybrid circuit 34 supplies the optical signal of the I component, in the X polarization component, to the first O/E converter 36A. The first optical hybrid circuit 34 supplies the optical signal of the Q component, in the X polarization component, to the second O/E converter 36B.

The second optical hybrid circuit 35 causes interference between the Y polarization component of the reception signal and the local light to acquire the optical signal having the I component and the Q component. The second optical hybrid circuit 35 supplies the optical signal of the I component, in the Y polarization component, to the third O/E converter 36C. The second optical hybrid circuit 35 supplies the optical signal of the Q component, in the Y polarization component, to the fourth O/E converter 36D.

The first O/E converter 36A performs electric conversion and gain adjustment to the optical signal of the I component in the X polarization component, which is supplied from the first optical hybrid circuit 34, and supplies the electrical signal subjected to the gain adjustment to the first ADC 37A. The first ADC 37A performs digital conversion to the electrical signal of the I component in the X polarization component and supplies the electrical signal subjected to the digital conversion to the DSP 39. The second O/E converter 36B performs the electric conversion and the gain adjustment to the optical signal of the Q component in the X polarization component, which is supplied from the first optical hybrid circuit 34, and supplies the electrical signal subjected to the gain adjustment to the second ADC 37B. The second ADC 37B performs the digital conversion to the electrical signal of the Q component in the X polarization component and supplies the electrical signal subjected to the digital conversion to the DSP 39.

The third O/E converter 36C performs the electric conversion and the gain adjustment to the optical signal of the I component in the Y polarization component, which is supplied from the second optical hybrid circuit 35, and supplies the electrical signal subjected to the gain adjustment to the third ADC 37C. The third ADC 37C performs the digital conversion to the electrical signal of the I component in the Y polarization component and supplies the electrical signal subjected to the digital conversion to the DSP 39. The fourth O/E converter 36D performs the electric conversion and the gain adjustment to the optical signal of the Q component in the Y polarization component, which is supplied from the second optical hybrid circuit 35, and supplies the electrical signal subjected to the gain adjustment to the fourth ADC 37D. The fourth ADC 37D performs the digital conversion to the electrical signal of the Q component in the Y polarization component and supplies the electrical signal subjected to the digital conversion to the DSP 39.

The DSP 39 performs digital signal processing to the I component and the Q component in the X polarization component, which are subjected to the digital conversion, and the I component and the Q component in the Y polarization communication, which are subjected to the digital conversion, to demodulate the X polarization component and the Y polarization component into a demodulation signal.

The first optical tap 38A stores the electrical signal of the I component in the X polarization component, which is supplied from the first ADC 37A, in the temporary storage 40. The second optical tap 38B stores the electrical signal of the Q component in the X polarization component, which is supplied from the second ADC 37B, in the temporary storage 40. The third optical tap 38C stores the electrical signal of the I component in the Y polarization component, which is supplied from the third ADC 37C, in the temporary storage 40. The fourth optical tap 38D stores the electrical signal of the Q component in the Y polarization component, which is supplied from the fourth ADC 37D, in the temporary storage 40. As a result, the temporary storage 40 stores reception patterns of the reception signals that have passed on the optical transmission line 5. The reception patterns are, for example, the reception signals, such as a probe signal and a pump signal.

Figure 5:
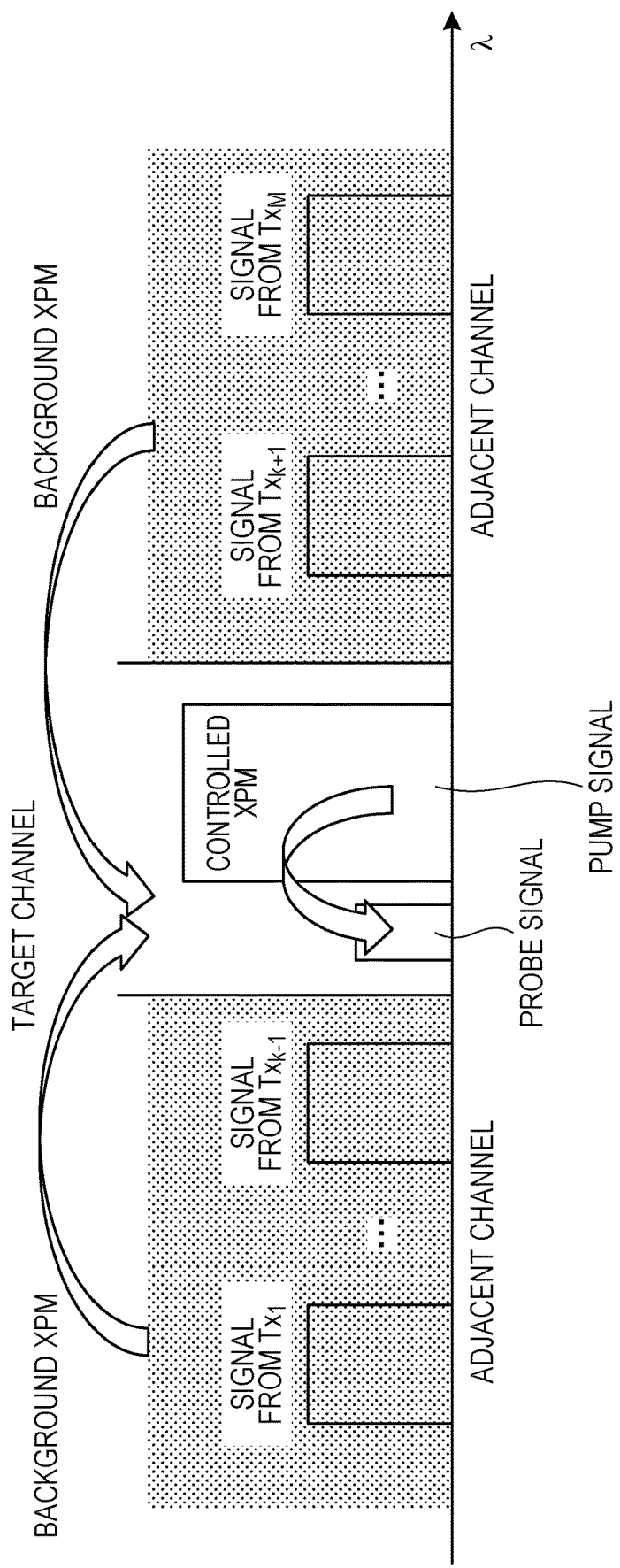
FIG. 5 is an explanatory diagram illustrating an example of how a target channel and adjacent channels are arranged.

FIG. 5 is an explanatory diagram illustrating an example of how a target channel and adjacent channels are arranged. The optical transmitter 11A in the communication apparatus 2 transmits the optical signal using multiple wavelengths in the target channel, among multiple wavelengths of a communication channel. The target channel is the channel of signals, used by the optical transmitter 11A. In addition, the optical transmitter 11A transmits the pump signal to the optical receiver 11B in the target communication apparatus 3 using a first wavelength, among the multiple wavelengths in the target channel, and transmits the probe signal to the optical receiver 11B in the target communication apparatus 3 using a second wavelength, among the multiple wavelengths in the target channel. In the pump signal, the amount of cross phase modulation (the amount of XPM) at each position on the optical transmission line 5 is varied in accordance with an amount of chromatic dispersion of the first wavelength. The XPM of the pump signal varies the probe signal of the second wavelength. The symbol rate of the pump signal is set so as to be higher than the symbol rate of the probe signal. As a result, since the symbol rate of the pump signal is made high, addition of the amount of chromatic dispersion of the first wavelength facilitates variation in the waveform of the pump signal. The pump signal is combined with the probe signal using, for example, Nyquist frequency division multiplexing. The optical transmitter 11A in another communication apparatus transmits the optical signal to another target communication apparatus using the multiple wavelengths in the target channel and the adjacent channels adjacent to the target channel. The adjacent channels are adjacent to the target channel and are the channels of signals, used by the other optical transmitter 11A. The target channel is affected by the XPM from the adjacent channels (background XPM).

Figure 6:
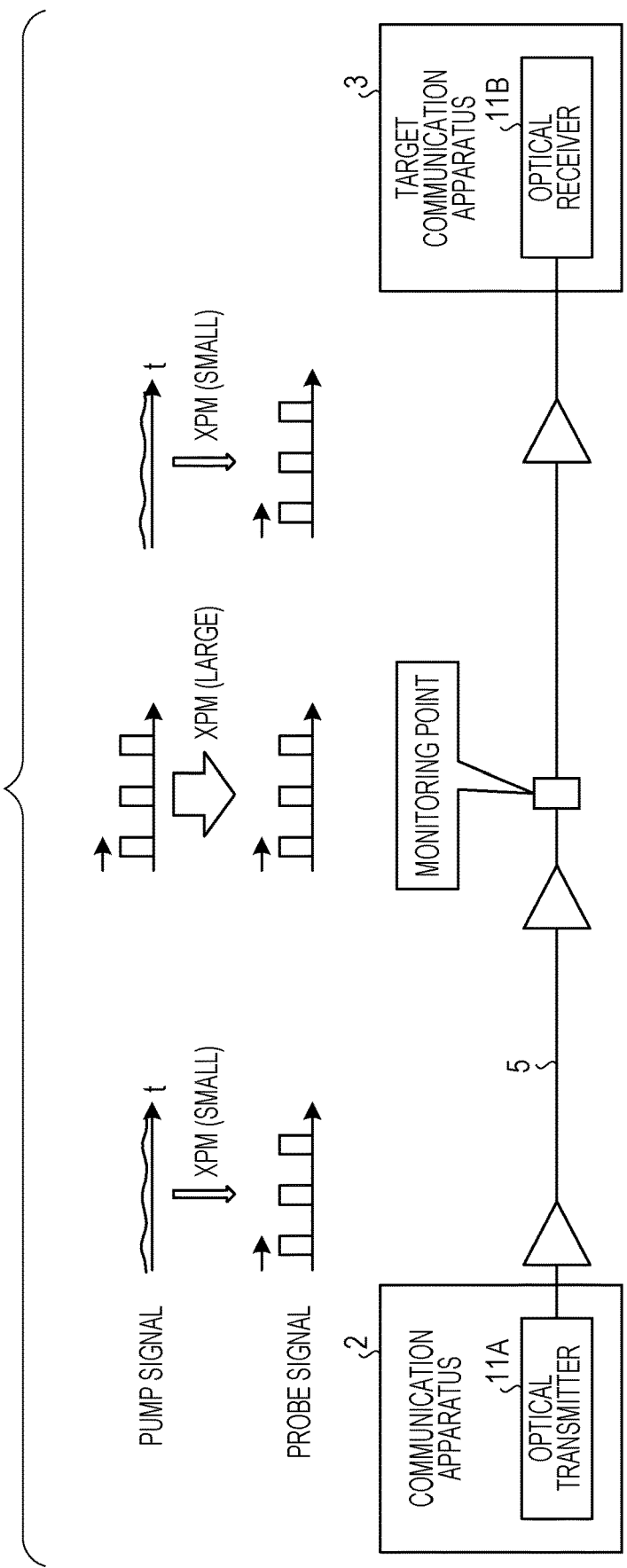
FIG. 6 is an explanatory diagram illustrating an example of the relationship between a pump signal, a probe signal, and the amount of XPM at each point on an optical transmission line.

FIG. 6 is an explanatory diagram illustrating an example of the relationship between the pump signal, the probe signal, and the amount of XPM at each point on the optical transmission line 5. The optical transmitter 11A sets the pump signal on the first wavelength and the probe signal on the second wavelength and transmits the pump signal and the probe signal to the optical receiver 11B. Here, the optical transmitter 11A sets the remaining amount of chromatic dispersion of the first wavelength at a monitoring point on the optical transmission line 5 so as to be equal to zero. As a result, the optical receiver 11B at the target side receives the probe signal less affected by the amount of XPM because, although the amount of XPM of the pump signal is gradually increased with the decreasing distance from the optical transmitter 11A to the monitoring point, the amount of XPM of the pump signal is small. However, since the variation in the amount of XPM of the pump signal is maximized when the pump signal passes on the monitoring point, the optical receiver 11B receives the probe signal greatly affected by the amount of XPM of the pump signal. Then, since the amount of XPM of the pump signal is gradually decreased with the decreasing distance from the monitoring point to the optical receiver 11B, the optical receiver 11B receives the probe signal less affected by the amount of XPM of the pump signal. The target communication apparatus 3 is capable of estimating the physical state, for example, a fiber parameter array at the monitoring point on the optical transmission line 5 in accordance with the variation in the received probe signal.

Figure 7:
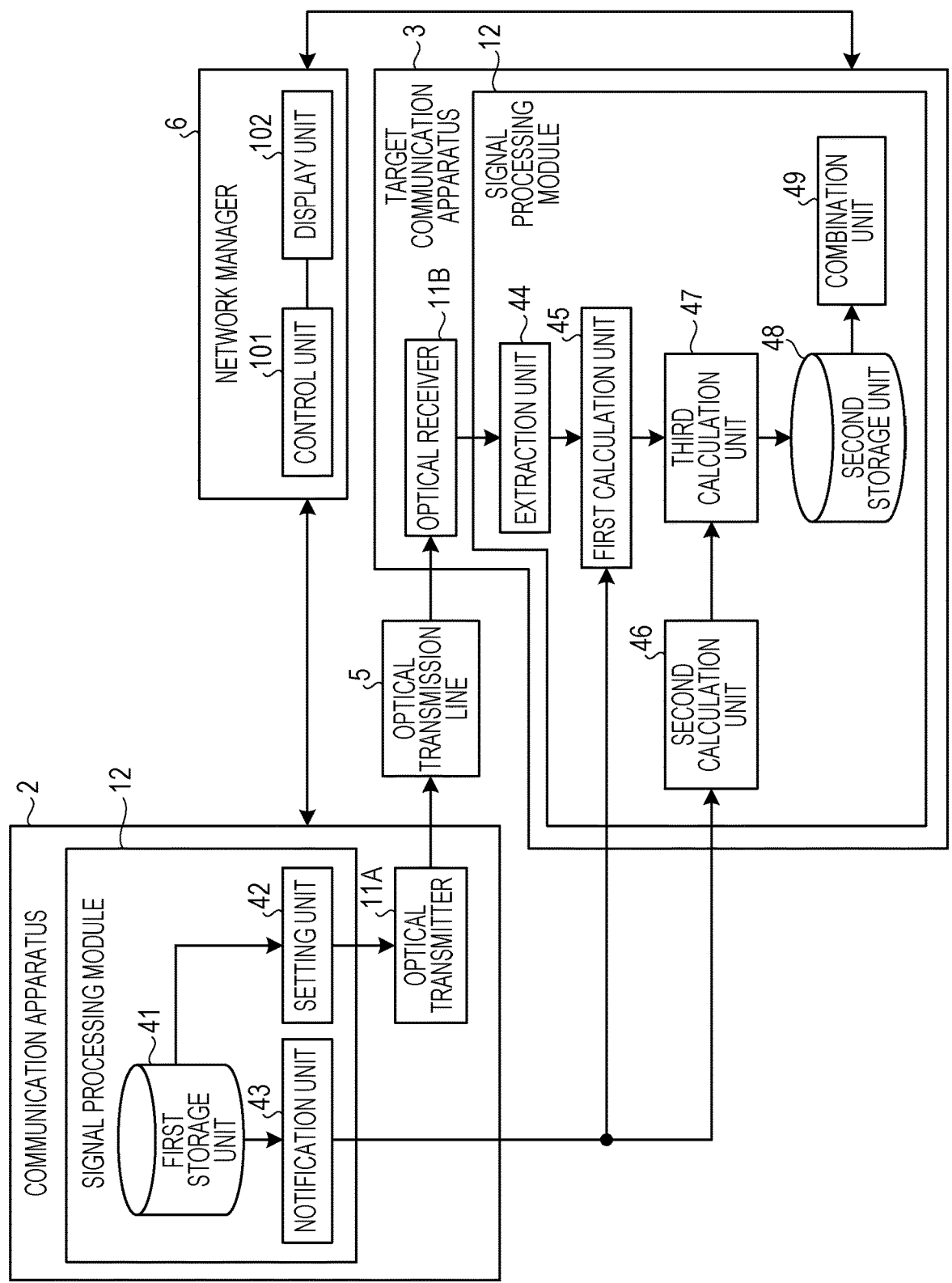
FIG. 7 is an explanatory diagram illustrating an example of the optical transmission system.

FIG. 7 is an explanatory diagram illustrating an example of the optical transmission system 1. The optical transmitter 11A in the communication apparatus 2 illustrated in FIG. 7 is included in the line card 11 in the communication apparatus 2. The optical receiver 11B in the target communication apparatus 3 is included in the line card 11 in the target communication apparatus 3.

The signal processing module 12 in the communication apparatus 2 includes a first storage unit (memory) 41, a setting unit 42, and a notification unit 43. The first storage unit 41 is an area where the multiple transmission patterns are stored. The transmission pattern is, for example, a transmission symbol array in which the pump signal is set on the first wavelength, the probe signal is set on the second wavelength, and the amount of chromatic dispersion is set so that the remaining amount of chromatic dispersion of the pump signal at the monitoring point on the optical transmission line 5 is equal to zero.

The setting unit 42 identifies the transmission pattern of the pump signal in which the remaining amount of chromatic dispersion at a desired monitoring point is equal to zero from the first storage unit 41 in measurement of fiber characteristics at the desired monitoring point on the optical transmission line 5 of the target channel. The setting unit 42 sets the identified transmission pattern in the optical transmitter 11A. The notification unit 43 notifies the signal processing module 12 in the target communication apparatus 3 of the transmission pattern set in the optical transmitter 11A. The notification unit 43 notifies the target communication apparatus 3 of the kind of the transmission pattern added to a header of the probe signal. Although the case is exemplified in the above embodiment in which the kind of the transmission pattern is added to the header of the probe signal, the target communication apparatus 3 may be notified of the transmission pattern over a management network different from the optical transmission line 5. Alternatively, an auxiliary channel for control may be superposed on the probe signal and the target communication apparatus 3 may be notified of the transmission pattern using the auxiliary channel for control.

The signal processing module 12 in the target communication apparatus 3 includes an extraction unit 44, a first calculation unit 45, a second calculation unit 46, a third calculation unit 47, a second storage unit (memory) 48, and a combination unit 49.

The extraction unit 44 extracts the reception pattern of the reception signal stored in the temporary storage 40 because the reception signals received with the optical receiver 11B are stored in the temporary storage 40. The reception patterns are the signal patterns of, for example, the pump signal and the probe signal. The first calculation unit 45 calculates an actual amount of XPM, which is an actual measurement value of the amount of XPM, based on the reception pattern extracted by the extraction unit 44 and the transmission pattern notified from the notification unit 43. The first calculation unit 45 performs a high-speed phase reproduction process. The first calculation unit 45 is an XPM-induced polarization scattering calculation unit that calculates an amount of XPM W(t) according to Formula 1 (refer to Z. Tao et al., "Simple fiber model for determination of XPM effects" *J.Lightw.Technol.*, Vol.29, No.7, pp.974-986, April 2011):

$$W(t) = \begin{pmatrix} \sqrt{1-|w_{xy}(t)|^2}\,\exp(j\phi_x(t)) & w_{yx}(t)\exp(j(\phi_x(t)+\phi_y(t))/2) \\ w_{xy}(t)\exp(j(\phi_x(t)+\phi_y(t))/2) & \sqrt{1-|w_{yx}(t)|^2}\,\exp(j\phi_y(t)) \end{pmatrix} \quad (1)$$

The first calculation unit 45 is capable of simplifying Formula 1 to Formula 2 under conditions of $|W_{yx}|^2 \ll 1$ and $|W_{xy}|^2 \ll 1$:

$$W(t) = \begin{pmatrix} 1 & w_{yx}(t) \\ w_{xy}(t) & 1 \end{pmatrix} \quad (2)$$

The first calculation unit 45 calculates $W_{yx}$ and $W_{xy}$ according to Formula 3. $W_{yx}$ denotes the amount of XPM from the Y polarization waves to the X polarization waves, and $W_{xy}$ denotes the amount of XPM from the X polarization waves to the Y polarization waves, $v_x$ and $v_y$ denote the reception pattern extracted by the optical receiver 11B, and $u_x$ and $u_y$ denote the transmission pattern received from the notification unit 43.

$$W_{yx}(t) = (v_x(t) - u_x(t))/u_y(t)$$

$$W_{xy}(t) = (v_y(t) - u_y(t))/u_x(t) \quad (3)$$

The second calculation unit 46 acquires the transmission pattern acquired from the notification unit 43 in the communication apparatus 2, that is, a transmission symbol array $u_{2,x/y,0}$. An estimated waveform $f_{x,x/y,n}$ at an n-th point is defined according to Formula 4. In Formula 4, $g_n$ denotes a function representing the variation in waveform due to accumulated chromatic dispersion to the n-th point.

$$f_{2,x/y,n} = u_{2,x/y,0} \otimes g_n \quad (4)$$

$W_{yx/xy}$ is calculated according to Formula 5 and Formula 6. Referring to Formula 5 and Formula 6, a subscript m denotes each channel (the probe signal when m=1 and the pump signal when m=2) and a subscript n denotes a span. Ln denotes the fiber length of an n-th transmission span, β' denotes a fiber group velocity dispersion coefficient, $α_n$ denotes the fiber loss of the n-th transmission span, $γ_n$ denotes a nonlinear parameter of the fiber of the n-th transmission span, ω denotes an angular frequency, and $H_{m,n}$ denotes the material characteristics of the optical transmission line 5 (refer to Z. Tao et al., "Simple fiber model for determination of XPM effects" *J.Lightw.Technol.*, Vol.29, No.7, pp.974-986, April 2011).

$$W_{yx/xy} = \sum_{m=2}^{M} \sum_{n=1}^{N} j u_{m,x/y,n}(0, t - \tau_{m,n}) u_{m,y/x,n}^*(0, t - \tau_{m,n}) \otimes h_{m,n}(t) \quad (5)$$

$$H_{m,n}(\omega) = \frac{8\gamma_n}{9} \frac{1 - \exp(-\alpha_n L_n + j\Delta\beta'_{m,n}\omega L_n)}{\alpha_n - j\Delta\beta'_{m,n}\omega} = IFT(h_{m,n}(t)) \quad (6)$$

A function $p_q(t)$ specified by a parameter q will be defined. A function that is normalized by specifying a parameter q={α,γ,L,Δβ} of a fiber candidate for which $h_{m,n}(t)$ defined in Formula 6 is supposed, is defined as $p_q(t)$. Alternatively, a filtering function (for example, a normalized Gaussian function) having an appropriate bandwidth q is defined as $p_q$. The second calculation unit 46 calculates an estimated amount of XPM, which is an estimated XPM value having a specific template waveform, according to Formula 7:

$$\text{Template}_{y/x}(n,q) = f_{2,x,n} f_{2,x,n}^* \otimes p_q \quad (7)$$

The third calculation unit 47 establishes cross correlation between a specific template waveform Template$_{y/x}$(n,q), which is similar to the waveform at a point n to be monitored and which is calculated by the second calculation unit 46, and $W_{yx}$ calculated by the first calculation unit 45 according to Formula 9 with reference to Formula 8. In addition, the third calculation unit 47 is capable of estimating an amount XC of $W_{yx}$ generated at the monitoring point n according to Formula 10. In Formula 10, xcorr(a,b) is a function for which the cross correlation is to be established. XC is calculated for the monitoring point n that is estimated, the parameter q, and the multiple transmission symbol arrays $u_{2,x/y,0}$ and is stored in the second storage unit 48. XC is interpreted as $W_{yx}$ at the monitoring point n measured under conditions $\{q, u_{2,x/y,0}\}$.

$$W_{yx} = \sum_{n=1}^{N} ju_{2,x,n}(0, t-t_{2,n})u^*_{2,y,n}(0, t-\tau_{2,n}) \otimes h_{2,n}(t) + \quad (8)$$

$$\sum_{m=3}^{M}\sum_{n=1}^{N} ju_{m,x,n}(0, t-\tau_{m,n})u^*_{m,y,n}(0, 1-\tau_{m,n}) \otimes h_{m,n}(t)$$

$$= \sum_{n=1}^{N} ju_{2,x,n}(0, t-\tau_{2,n})u^*_{2,y,n}(0, t-\tau_{2,n}) \otimes h_{2,n}(t) + \text{Noise}$$

$$ju_{2,x,n}(0, t-\tau_{2,n})u^*_{2,y,n}(0, t-\tau_{2,n}) \otimes h_{2,n}(t) \quad (9)$$

$$XC(n, q) = xcorr(w_{yx}, \text{Template}_{yx}(n, q)) \quad (10)$$

Figure 8:
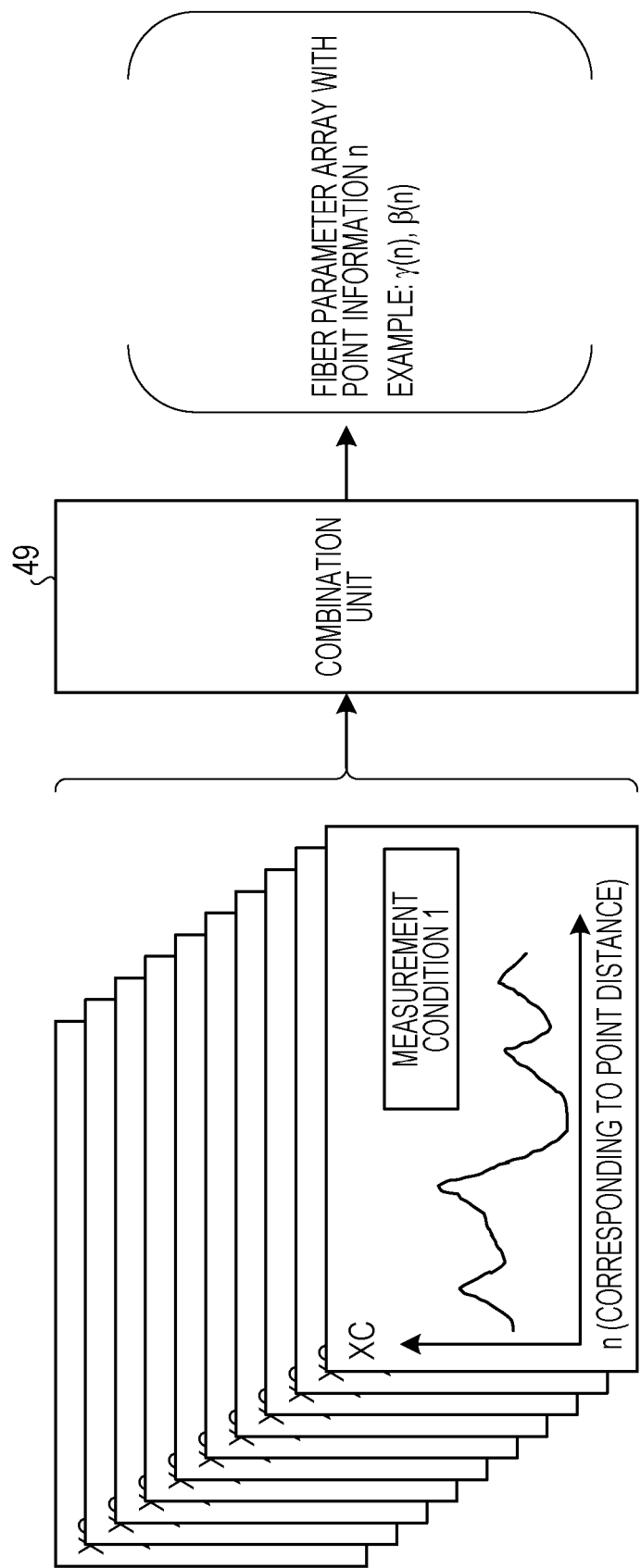
FIG. 8 is an explanatory diagram illustrating an example of a combination unit.

FIG. 8 is an explanatory diagram illustrating an example of the combination unit 49. The combination unit 49 illustrated in FIG. 8 is, for example, an estimating unit that combines XC(n) measured under the multiple conditions $\{q, u_{2,x/y,0}\}$ to generate a most probable fiber parameter array (for example, γ(n) or β(n)) at the monitoring point n. The combination unit 49 notifies the network manager 6 of the estimated fiber parameter array. A control unit 101 in the network manager 6 displays the fiber parameter array at the monitoring point n in a display unit 102. As a result, a manager of the network manager 6 is capable of recognizing the physical state at the monitoring point n on the optical transmission line 5 with reference to the content of the display in the display unit 102.

Figure 9:
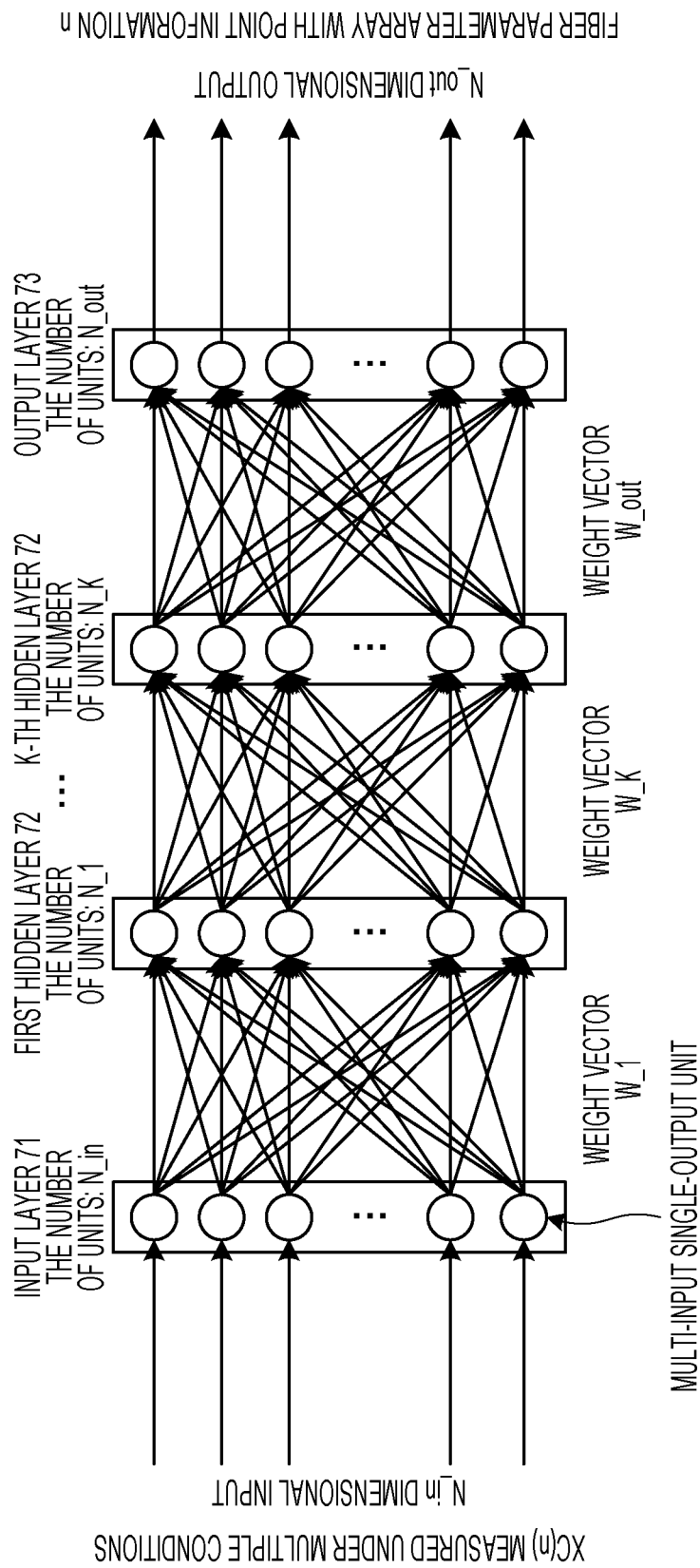
FIG. 9 is an explanatory diagram illustrating an exemplary case in which a DNN is applied as the combination unit.
Figure 10:
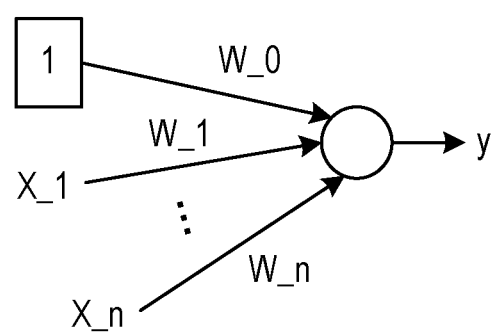
FIG. 10 is an explanatory diagram illustrating an example of a multi-input single-output unit in the DNN.

FIG. 9 is an explanatory diagram illustrating an exemplary case in which a deep neural network (DNN) 61 is applied as the combination unit 49. The DNN 61 outputs the fiber parameter array at the point n, which results from weighting XC measured under the multiple conditions with weight factors. The DNN 61 includes an input layer 71, first to K-th hidden layers 72, and an output layer 73. The input layer 71 includes multiple multi-input single-output units. Each of the first to K-th hidden layers 72 also includes multiple multi-input single-output units. The output layer 73 also includes multiple multi-input single-output units. FIG. 10 is an explanatory diagram illustrating an example of the multi-input single-output unit in the DNN 61. The multi-input single-output unit illustrated in FIG. 10 outputs a single vector from multiple input vectors according to Formula 11. In Formula 11, x_1 to x_n denote input vectors into neurons, y denotes an output from the neurons, w0 to wn denote neuron weighting factors, and f( ) denotes a neuron activation function. The activation function is, for example, a sigmoid function, a ReLU function, or a Maxout function.

$$y = f\left(\sum_{k=1}^{n} w_k x_k + w_0\right) \quad (11)$$

Figure 11:
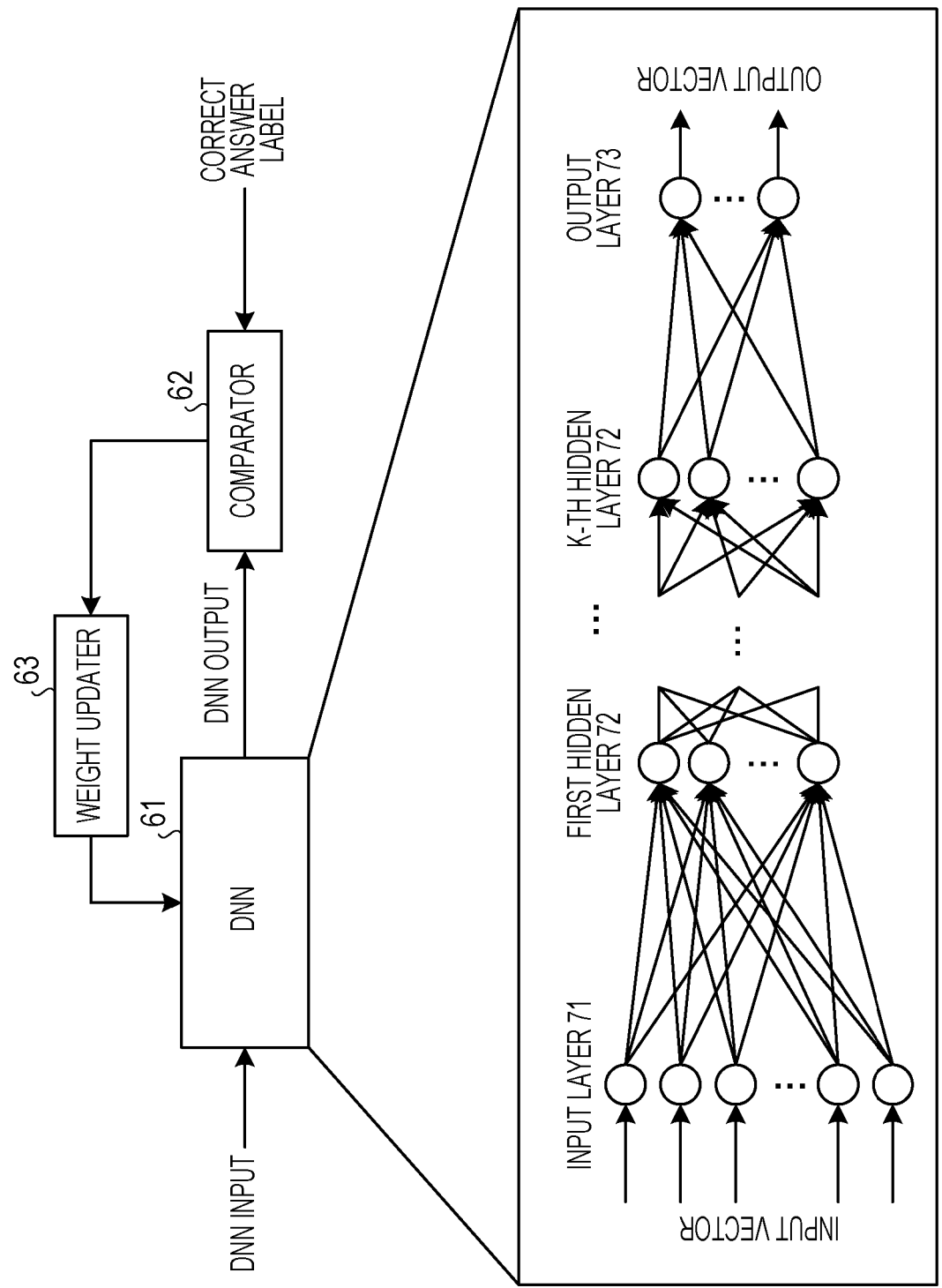
FIG. 11 is an explanatory diagram illustrating an example of a training process performed by the DNN in the combination unit.

FIG. 11 is an explanatory diagram illustrating an example of a training process performed by the DNN 61 in the combination unit 49. The combination unit 49 includes the DNN 61, a comparator 62, and a weight updater 63. The comparator 62 compares the output from the DNN 61 with a correct answer label. The weight updater 63 updates the weighting factors of the DNN 61 based on the result of the comparison. The comparator 62 calculates an error L from the difference between the correct answer label and the output from the DNN 61. The weight updater 63 adjusts a weighting factor {wi} so that the error L is decreased. Specifically, the weight updater 63 adjusts each weight through error back propagation. The weight updater 63 terminates the training when the error L is made smaller than a predetermined value.

Figure 12:
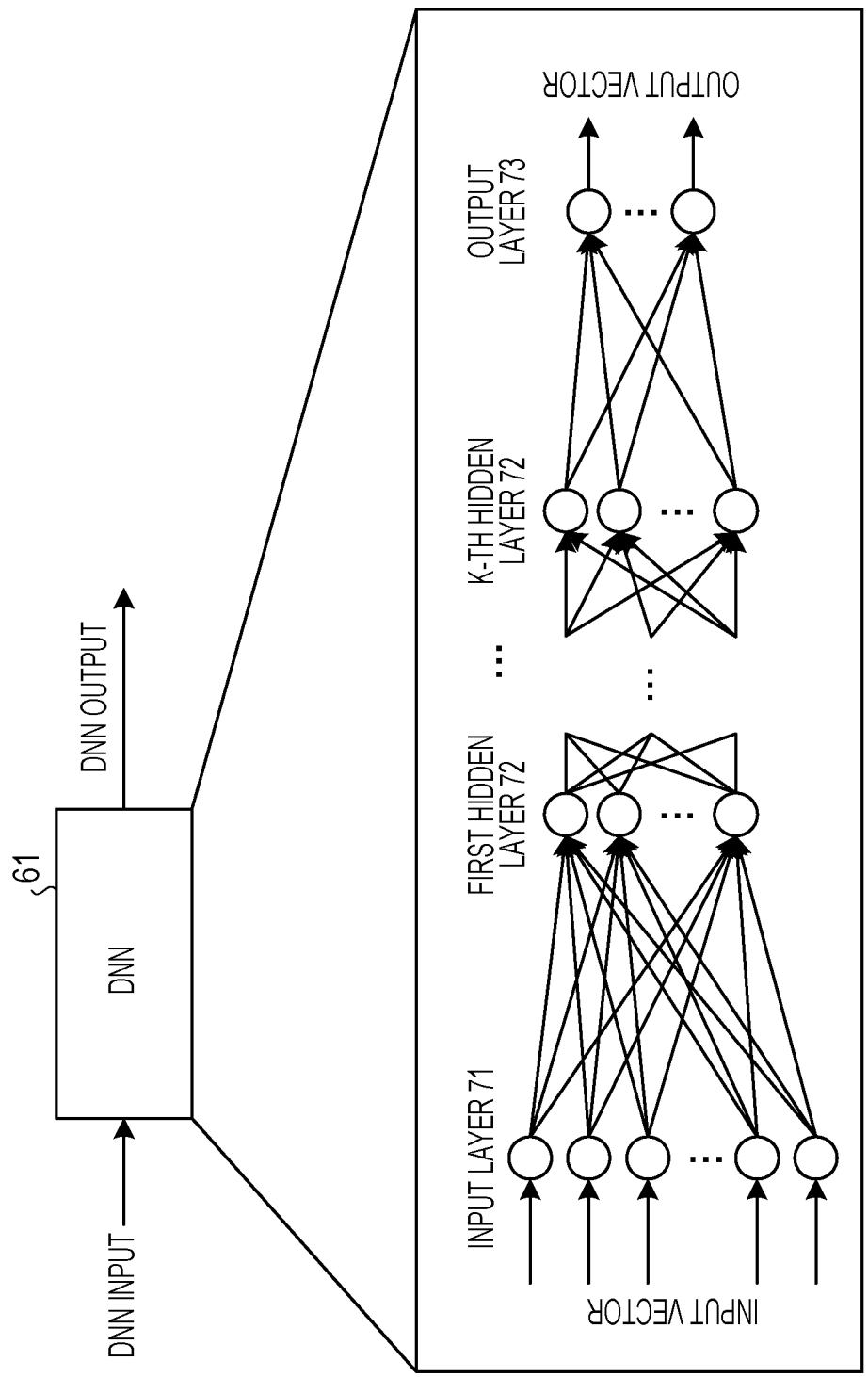
FIG. 12 is an explanatory diagram illustrating an example of an operation process performed by the combination unit.

FIG. 12 is an explanatory diagram illustrating an example of an operation process performed by the combination unit 49. The weight updater 63 sets the weighting factor {wi} acquired through the training process in the DNN 61. During the operation, the weighting factor is not updated. The DNN 61 outputs XC measured under the multiple conditions as the fiber parameter array at the point n based on the weighting factor that is set.

Figure 13:
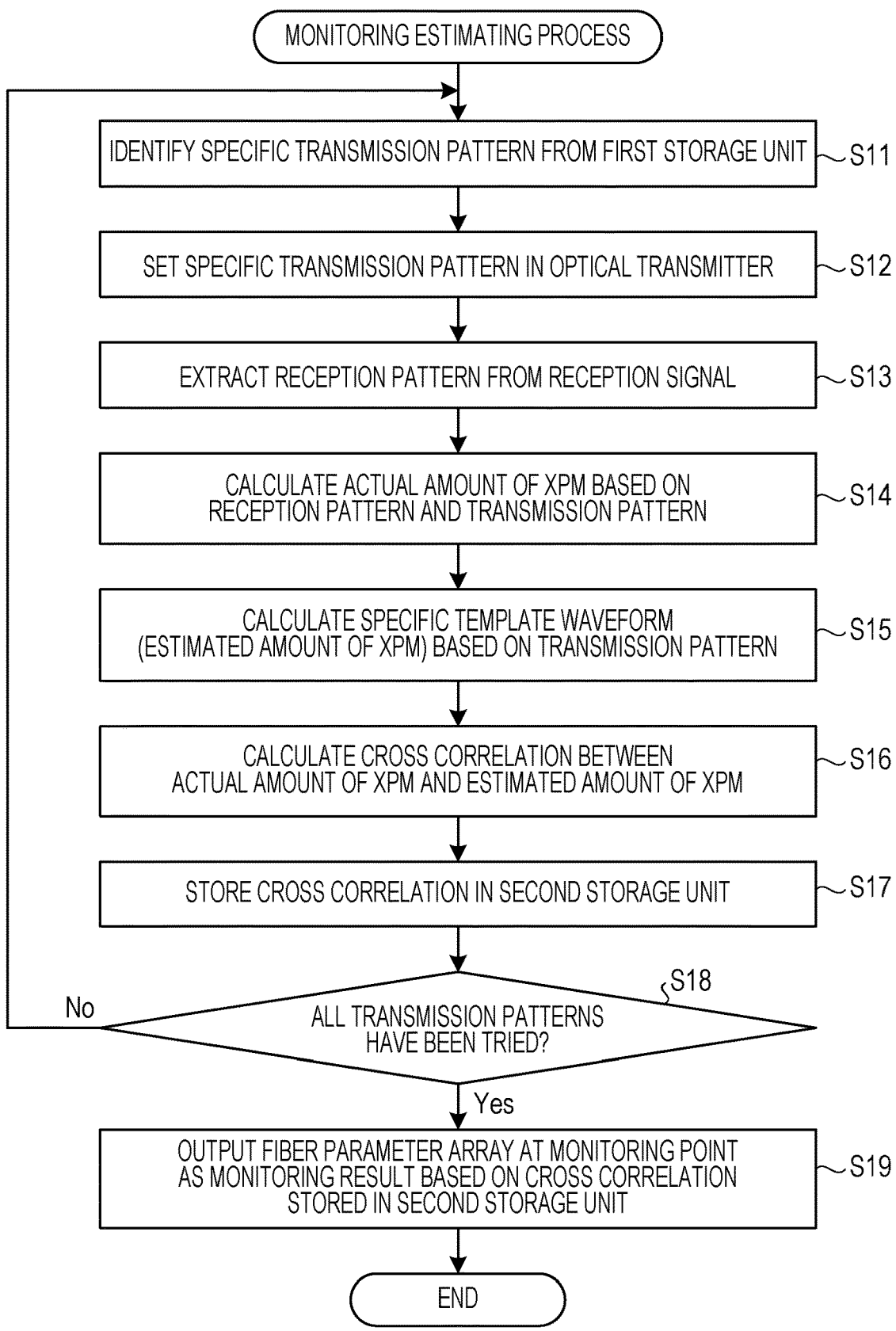
FIG. 13 is a flowchart illustrating an exemplary operational process of the entire optical transmission system concerning a fiber parameter array estimating process.

An exemplary operation of the optical transmission system 1 according to the present embodiment will now be described. FIG. 13 is a flowchart illustrating an exemplary operational process of the entire optical transmission system 1 concerning a fiber parameter array estimating process. Referring to FIG. 13, in Operation S11, the setting unit 42 in the communication apparatus 2 identifies a specific transmission pattern from the first storage unit 41. The specific transmission pattern is the transmission symbol array of the pump signal and the probe signal in chromatic dispersion pre-equalization in which, for example, the amount of chromatic dispersion at which the remaining amount of chromatic dispersion of the first wavelength at a desired monitoring point is equal to zero is added. In Operation S12, the setting unit 42 sets the identified transmission pattern in the optical transmitter 11A. In Operation S13, the extraction unit 44 in the target communication apparatus 3 extracts the reception pattern from the reception signal received by the optical receiver 11B. The reception pattern is the signal pattern including the pump signal and the probe signal received by the optical receiver 11B. In Operation S14, the first calculation unit 45 in the target communication apparatus 3 calculates the actual amount of XPM (the actual measurement value of the amount of XPM) at the desired monitoring point based on the reception pattern and the transmission pattern acquired from the notification unit 43 in the communication apparatus 2.

In Operation S15, the second calculation unit 46 in the target communication apparatus 3 calculates the estimated amount of XPM, which is a specific template waveform at the desired monitoring point, based on the transmission pattern acquired from the notification unit 43 in the communication apparatus 2. In Operation S16, the third calculation unit 47 in the target communication apparatus 3 calculates the cross correlation XC between the actual amount of XPM and the estimated amount of XPM. The cross correlation indicates the reliability of information. In Operation S17, the third calculation unit 47 stores the cross correlation XC in the second storage unit 48. In Operation S18, the third calculation unit 47 determines whether all the transmission patterns have been tried.

If all the transmission patterns have been tried (YES in Operation S18), in Operation S19, the combination unit 49 in the target communication apparatus 3 outputs the fiber parameter array of, for example, contribution of nonlinear effect at the monitoring point as the result of the monitoring based on the cross correlation XC stored in the second storage unit 48. Then, the operational process illustrated in FIG. 13 is terminated. If all the transmission patterns have not been tried (NO in Operation S18), the process goes back to Operation S11 to identify the next specific transmission pattern from the first storage unit 41.

The communication apparatus 2 of the present embodiment adds the amount of chromatic dispersion to the first wavelength so that the remaining amount of chromatic dispersion at a desired monitoring point on the optical transmission line 5 is equal to zero, modulates the pump signal to the first wavelength and the probe signal to the second wavelength, and transmits the pump signal and the probe signal to the optical transmission line 5. As a result, the amount of XPM of the pump signal passing through the desired monitoring point is increased. The target communication apparatus 3 receives the probe signal that is varied due to the effect of the amount of XPM of the pump signal at the desired monitoring point.

In addition, the target communication apparatus 3 calculates the actual amount of XPM based on the reception pattern at the desired monitoring point and the transmission pattern notified from the communication apparatus 2. Furthermore, the target communication apparatus 3 calculates the estimated amount of XPM at the desired monitoring point based on the transmission pattern notified from the communication apparatus 2. Furthermore, the target communication apparatus 3 estimates the physical state of the optical transmission line 5, such as the fiber parameter array, at the monitoring point based on the cross correlation between the actual amount of XPM and the estimated amount of XPM at the monitoring point. As a result, it is possible to monitor the physical state at the desired monitoring point even on the optical transmission line 5 having the multi-span configuration without increasing the number of components.

The communication apparatus 2 sets the symbol rate of the pump signal so as to be higher than the symbol rate of the probe signal. As a result, since the symbol rate of the pump signal is made high, addition of the amount of chromatic dispersion of the first wavelength facilitates the variation in the signal wavelength of the pump signal.

The communication apparatus 2 notifies the target communication apparatus 3 of the transmission pattern, which is stored in the header in the probe signal. As a result, the target communication apparatus 3 is capable of identifying the transmission pattern at the communication apparatus 2 side.

Figure 14:
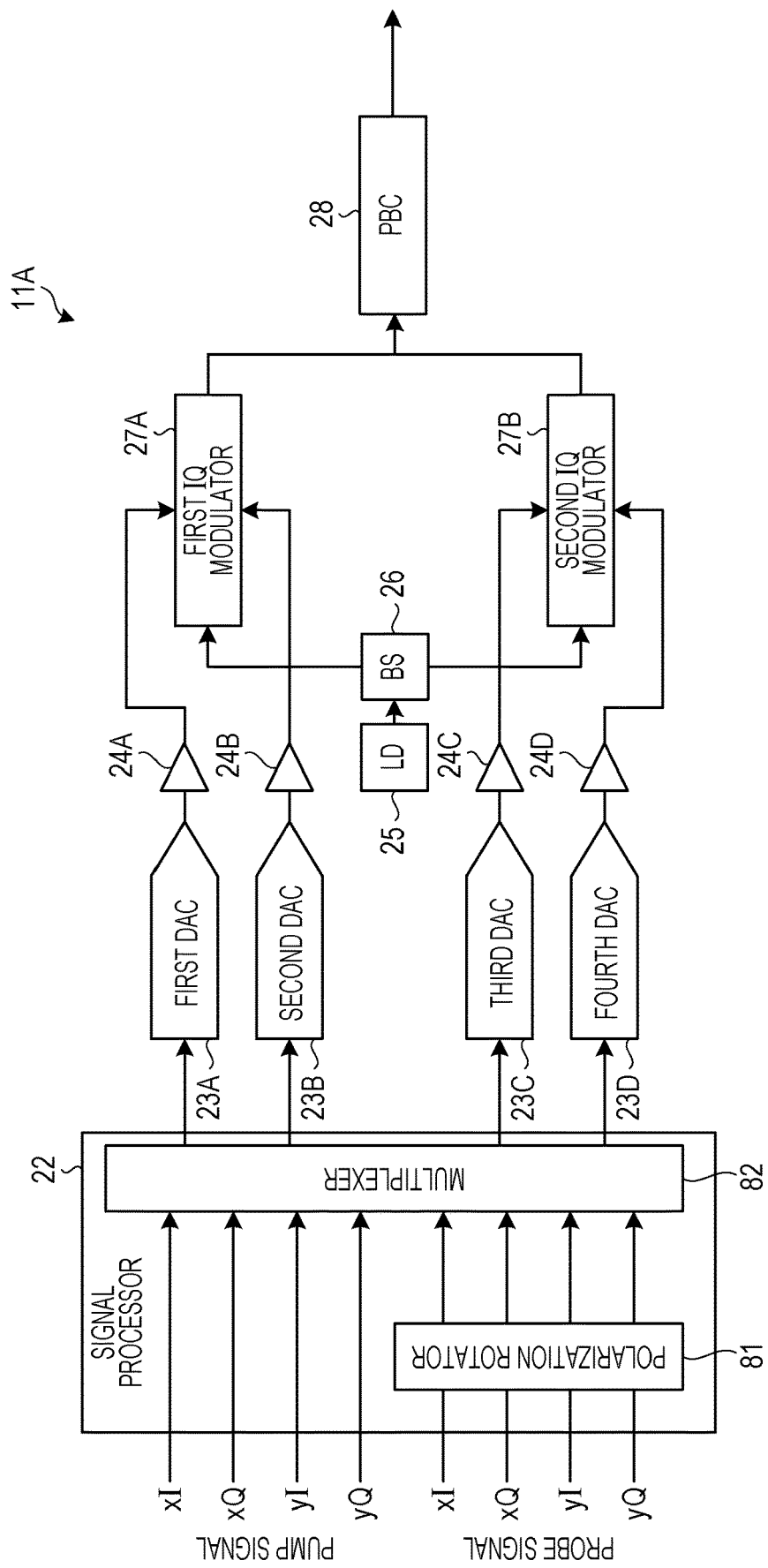
FIG. 14 is an explanatory diagram illustrating an example of the optical transmitter adding polarization rotation.

Although the case is exemplified in the embodiment described above in which the amount of chromatic dispersion is added to the pump signal as the transmission pattern, a certain amount of polarization rotation may be added between the pump signal and the probe signal, in addition to the addition of the amount of chromatic dispersion. FIG. 14 is an explanatory diagram illustrating an example of the optical transmitter 11A adding the polarization rotation. The same reference numerals are used in the optical transmitter 11A in FIG. 14 to identify the same components in the optical transmitter 11A illustrated in FIG. 3. A duplicated description of such components and operations is omitted herein.

The signal processor 22 in the optical transmitter 11A illustrated in FIG. 14 includes a polarization rotator 81 and a multiplexer 82. The polarization rotator 81 performs polarization rotation of the probe signal. Specifically, the polarization rotator 81 performs the polarization rotation of the probe signal by a certain amount. The multiplexer 82 is a frequency domain multiplexer that performs frequency multiplexing of the pump signal and the probe signal subjected to the polarization rotation in the polarization rotator 81. The multiplexer 82 supplies the pump signal and the probe signal subjected to the frequency multiplexing to the first DAC 23A to the fourth DAC 23D.

Figure 15:
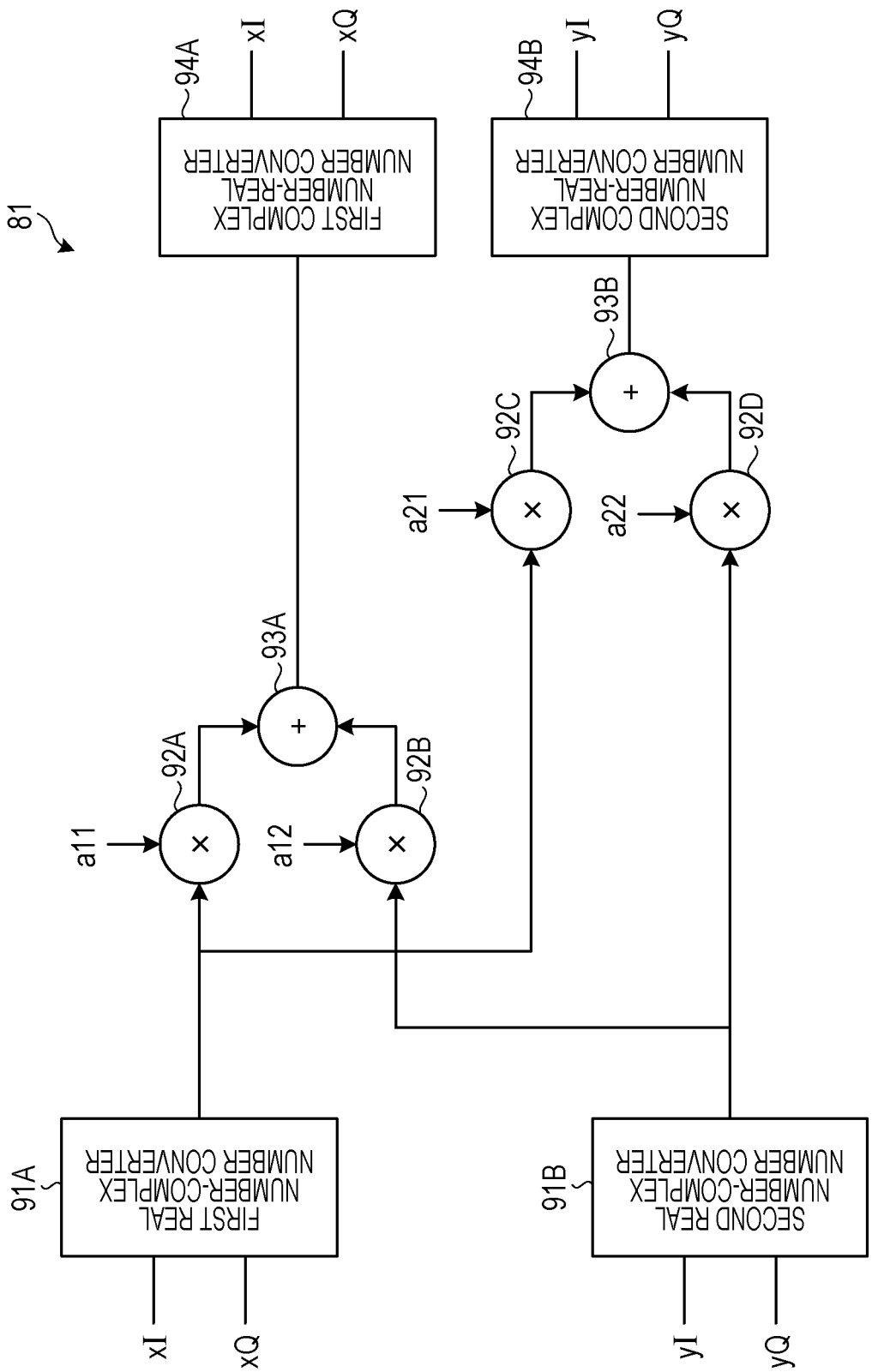
FIG. 15 is an explanatory diagram illustrating an example of a polarization rotator.

FIG. 15 is an explanatory diagram illustrating an example of the polarization rotator 81. Referring to FIG. 15, the polarization rotator 81 includes a first real number-complex number converter 91A, a second real number-complex number converter 91B, first to fourth multipliers 92A to 92D, a first adder 93A, and a second adder 93B. The polarization rotator 81 further includes a first complex number-real number converter 94A and a second complex number-real number converter 94B.

The first real number-complex number converter 91A converts the I component and the Q component of the X polarization component of the probe signal into complex numbers. The second real number-complex number converter 91B converts the I component and the Q component of the Y polarization component of the probe signal into complex numbers. The first multiplier 92A performs multiplication by a11. The second multiplier 92B performs multiplication by a12. The third multiplier 92C performs multiplication by a21. The fourth multiplier 92D performs multiplication by a22. The first multiplier 92A, the second multiplier 92B, the third multiplier 92C, and the fourth multiplier 92D are complex number multipliers. In the above description, a11, a12, a21, and a22 are illustrated in Formula 12. In Formula 12, $\omega\tau$ denotes the angular speed of the polarization rotation.

$$\begin{pmatrix} a_{11} & a_{12} \\ a_{21} & a_{22} \end{pmatrix} = \begin{pmatrix} \cos\omega_T t & -\sin\omega_T t \\ \sin\omega_T t & \cos\omega_T t \end{pmatrix} \quad (12)$$

The first adder 93A adds the output from the first multiplier 92A to the output from the second multiplier 92B. The second adder 93B adds the output from the third multiplier 92C to the output from the fourth multiplier 92D. The first complex number-real number converter 94A converts the complex numbers of the I component and the Q component of the X polarization component, supplied from the first adder 93A, into real numbers. The second complex number-real number converter 94B converts the complex numbers of the I component and the Q component of the Y polarization component, supplied from the second adder 93B, into real numbers.

Specifically, the first real number-complex number converter 91A converts the I component and the Q component of the X polarization component of the probe signal into complex numbers and supplies the I component and the Q component of the X polarization component, which have been converted into the complex numbers, to the first multiplier 92A and the third multiplier 92C. The second real number-complex number converter 91B converts the I component and the Q component of the Y polarization component of the probe signal into complex numbers and supplies the I component and the Q component of the Y polarization component, which have been converted into the complex numbers, to the second multiplier 92B and the fourth multiplier 92D.

The first multiplier 92A multiplies the I component and the Q component of the X polarization component by a11 and supplies the I component and the Q component of the X polarization component, subjected to the multiplication, to the first adder 93A. The second multiplier 92B multiplies the I component and the Q component of the Y polarization component by a12 and supplies the I component and the Q component of the Y polarization component, subjected to the multiplication, to the first adder 93A. The first adder 93A adds the I component and the Q component of the X polarization component, which are output from the first multiplier 92A, to the I component and the Q component of the Y polarization component, which are output from the second multiplier 92B, to supply the result of the addition to the first complex number-real number converter 94A. The first complex number-real number converter 94A converts the I component and the Q component of the X polarization component into real numbers and supplies the real numbers to the multiplexer 82.

The third multiplier 92C multiplies the I component and the Q component of the X polarization component by a21 and supplies the I component and the Q component of the X polarization component, subjected to the multiplication, to the second adder 93B. The fourth multiplier 92D multiplies the I component and the Q component of the Y polarization component by a22 and supplies the I component and the Q component of the Y polarization component, subjected to the multiplication, to the second adder 93B. The second adder 93B adds the I component and the Q component of the X polarization component, which are output from the third multiplier 92C, to the I component and the Q component of the Y polarization component, which are output from the fourth multiplier 92D, to supply the result of the addition to the second complex number-real number converter 94B. The second complex number-real number converter 94B converts the I component and the Q component of the Y polarization component into real numbers and supplies the real numbers to the multiplexer 82.

In other words, the first complex number-real number converter 94A and the second complex number-real number converter 94B supply the probe signal subjected to the polarization rotation with the I component and the Q component of the X polarization component, which are converted into the real numbers, and the I component and the Q component of the Y polarization component, which are converted into the real numbers, to the multiplexer 82. As a result, a certain amount of polarization rotation is capable of being added between the probe signal and the pump signal. Accordingly, the physical state at the monitoring point in consideration of the polarization rotation is capable of being monitored. Although the polarization rotator 81 illustrated in FIG. 14 adds a certain amount of polarization rotation to the probe signal, a certain amount of polarization rotation may be added to the pump signal.

The case is exemplified in the transmission pattern of the embodiment described above in which the amount of chromatic dispersion is added to the first wavelength of the pump signal and the polarization rotation is added to the probe signal so that the probe signal at the monitoring point is capable of being monitored. However, the transmission pattern is not limited to the above case. For example, change of a modulation pattern of the pump signal, change of frequency shaping of the pump signal, or the like may be performed, in addition to the addition of the amount of chromatic dispersion, so that the probe signal at the monitoring point is capable of being monitored. The transmission pattern may be appropriately varied.

In the embodiment described above, time division of the transmission timing of a main signal and periodic insertion of the transmission timing of the pump signal and the transmission timing of the probe signal into the transmission timing of the main signal enable the physical state at the monitoring point to be monitored while transmitting the main signal.

The case is exemplified for convenience in which the signal processing module 12 at the communication apparatus 2 side, illustrated in FIG. 7, includes the first storage unit 41, the setting unit 42, and the notification unit 43. The case is exemplified in which the signal processing module 12 at the target communication apparatus 3 side includes the extraction unit 44, the first calculation unit 45, the second calculation unit 46, the third calculation unit 47, the second storage unit 48, and the combination unit 49. However, the configurations of the signal processing modules 12 in the communication apparatus 2 and the target communication apparatus 3 are not limited to above ones. The signal processing module 12 may include the first storage unit 41, the setting unit 42, the notification unit 43, the extraction unit 44, the first calculation unit 45, the second calculation unit 46, the third calculation unit 47, the second storage unit 48, and the combination unit 49.

The signal processing module 12 may be realized by, for example, software, a DSP, a field programmable gate array (FPGA), or an application specific integrated circuit (ASIC). Alternatively, the signal processing module 12 may be installed as part of the line card 11, the network manager 6, or the like and the configuration of the signal processing module 12 may be appropriately varied.

The components illustrated in the drawings may not be physically configured in the manner illustrated in the drawings. In other words, specific modes of distribution and integration of the components are not limited to the ones illustrated in the drawings and all or part of the components may be mechanically or physically distributed or integrated in arbitrary units in accordance with various loads and usage.

All or part of various processing functions performed in the respective apparatuses may be performed on a central processing unit (CPU) or a microcomputer, such as a micro processing unit (MPU) or a micro controller unit (MCU). All or part of the various processing functions may be performed on programs analyzed and executed by the CPU or the microcomputer, such as the MPU or the MCU, or hardware of wired logic.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A transmission apparatus comprising:
a transmitter configured to modulate a signal to a first signal having a first wavelength and a signal to a second signal having a second wavelength, and transmit the first signal and the second signal to a transmission line so that the second signal is varied in accordance with variation in an amount of cross phase modulation of the first signal passing through each position on the transmission line; and a signal processor configured to include at least one of a logic device and a processor, and configured to add an amount of chromatic dispersion at which a remaining amount of chromatic dispersion of the first wavelength at a certain position on the transmission line is equal to zero to the first wavelength in the transmission of the first signal and the second signal, wherein the transmitter includes a polarization rotator configured to add a certain amount of polarization rotation between the first signal and the second signal, and a multiplexer configured to perform multiplexing of the first signal and the second signal, to which the certain amount of polarization rotation is added, and wherein the transmitter transmits the first signal and the second signal, which are subjected to the multiplexing in the multiplexer, to the transmission line.

2. The transmission apparatus according to claim 1, further comprising:

a memory configured to store a transmission pattern that corresponds to the amount of chromatic dispersion and that concerns the first signal and the second signal, wherein the signal processor identifies the transmission pattern corresponding to the amount of chromatic dispersion at which the remaining amount of chromatic dispersion of the first wavelength at the certain position is equal to zero from the memory and adds the amount of chromatic dispersion of the identified transmission pattern to the first wavelength.

3. The transmission apparatus according to claim 1, wherein the transmitter transmits the first signal and the second signal to the transmission line, a symbol rate of the first signal being set higher than a symbol rate of the second signal.

4. The transmission apparatus according to claim 1, further comprising:

a notification unit configured to notify a target reception apparatus connected to the transmission line of a transmission pattern which includes the amount of chromatic dispersion added by the signal processor and which is stored in a header of the second signal.

5. A reception apparatus comprising:

a receiver configured to receive a second signal from a transmission apparatus, the second signal being varied in accordance with variation in an amount of cross phase modulation of a first signal passing through each position on a transmission line, the transmission apparatus modulating a signal to the first signal having a first wavelength and a signal to the second signal having a second wavelength and transmitting the first signal and the second signal to the transmission line; and a signal processor configured to include at least one of a logic device and a processor, and configured to:

receive a reception signal including the second signal that is varied with the variation in the amount of cross phase modulation of the first signal to which an amount of chromatic dispersion at which a remaining amount of chromatic dispersion of the first wavelength at a certain position on the transmission line is equal to zero is added, first calculate an actual measurement value of the amount of cross phase modulation at the certain position, based on the reception signal and a transmission pattern that corresponds to the amount of chromatic dispersion notified from the transmission apparatus and that concerns the first signal and the second signal, second calculate an estimated value of the amount of cross phase modulation at the certain position, based on the transmission pattern notified from the transmission apparatus, third calculate cross correlation between the actual measurement value of the amount of the cross phase modulation at the certain position, calculated by the first calculating, and the estimated value of the amount of cross phase modulation at the certain position, calculated by the second calculating, and estimate characteristics of the transmission line at the certain position based on the cross correlation of the amount of the cross phase modulation at the certain position calculated by the third calculating.

6. A method for estimating characteristics of a transmission line coupled between a transmission apparatus and a reception apparatus, the method comprising:

modulating a signal to a first signal having a first wavelength and a signal to a second signal having a second wavelength;

transmitting the first signal and the second signal to a transmission line so that the second signal is varied in accordance with variation in an amount of cross phase modulation of the first signal passing through each position on the transmission line;

adding an amount of chromatic dispersion at which a remaining amount of chromatic dispersion of the first wavelength at a certain position on the transmission line is equal to zero to the first wavelength in the transmission of the first signal and the second signal, by the transmission apparatus;

receiving a reception signal including the second signal that is varied with the variation in the amount of cross phase modulation of the first signal;

first calculating an actual measurement value of the amount of cross phase modulation at the certain position, based on the reception signal and a transmission pattern that corresponds to the amount of chromatic dispersion notified from the transmission apparatus and that concerns the first signal and the second signal;

second calculating an estimated value of the amount of cross phase modulation at the certain position, based on the transmission pattern notified from the transmission apparatus;

third calculating cross correlation between the actual measurement value of the amount of the cross phase modulation at the certain position, calculated by the first calculating, and the estimated value of the amount of the cross phase modulation at the certain position, calculated by the second calculating; and estimating characteristics of the transmission line at the certain position based on the cross correlation of the amount of cross phase modulation at the certain position calculated by the third calculating.

7. The method according to claim 6, further comprising:

storing, in a memory, a transmission pattern that corresponds to the amount of chromatic dispersion and that concerns the first signal and the second signal;

the identifying identifies the transmission pattern corresponding to the amount of chromatic dispersion at which the remaining amount of chromatic dispersion of the first wavelength at the certain position is equal to zero from the memory; and the adding adds the amount of chromatic dispersion of the identified transmission pattern to the first wavelength.

8. The method according to claim 6,
wherein a symbol rate of the first signal being set higher than a symbol rate of the second signal.

9. The method according to claim 6, further comprising:
notifying a target reception apparatus connected to the transmission line of a transmission pattern which includes the amount of chromatic dispersion added by the adding, the notification is included in a header of the second signal.

10. A method for estimating characteristics of a transmission line coupled between a transmission apparatus and a reception apparatus, the method comprising:
modulating a signal to a first signal having a first wavelength and a signal to a second signal having a second wavelength;
transmitting the first signal and the second signal to a transmission line so that the second signal is varied in accordance with variation in an amount of cross phase modulation of the first signal passing through each position on the transmission line;
adding an amount of chromatic dispersion at which a remaining amount of chromatic dispersion of the first wavelength at a certain position on the transmission line is equal to zero to the first wavelength in the transmission of the first signal and the second signal, by the transmission apparatus;
adding, with a polarization rotator, a certain amount of polarization rotation between the first signal and the second signal;
performing multiplexing of the first signal and the second signal, to which the certain amount of polarization rotation is added; and
the transmitting transmits the first signal and the second signal, which are subjected to the multiplexing in the multiplexer, to the transmission line.

* * * * *